Jan. 9, 1968 R. A. MUNSE 3,362,278
NUT IMPRESSIONS
Filed May 6, 1966
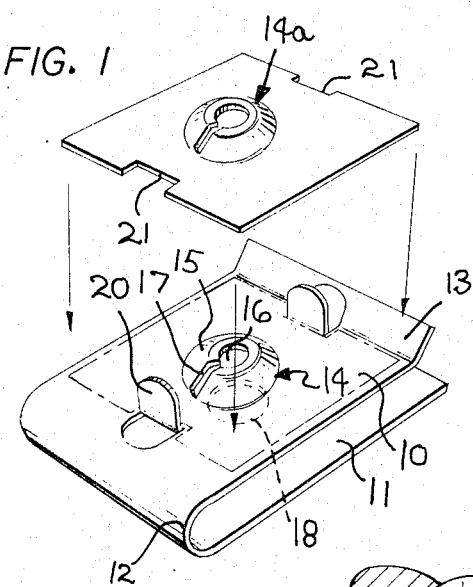
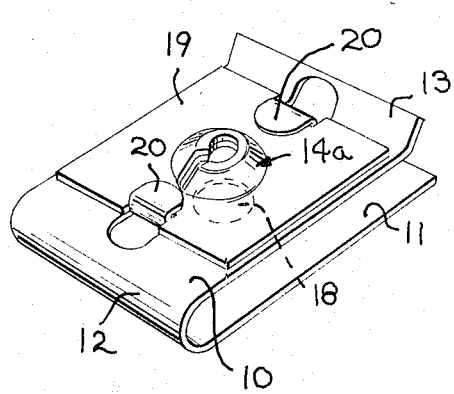
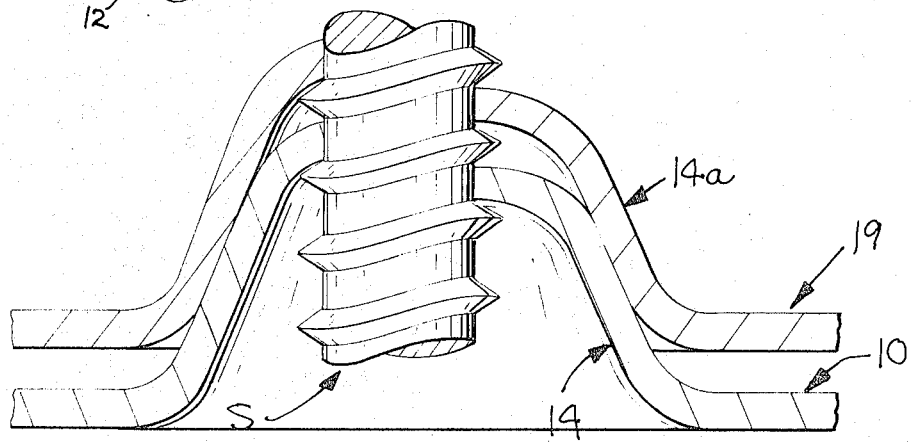
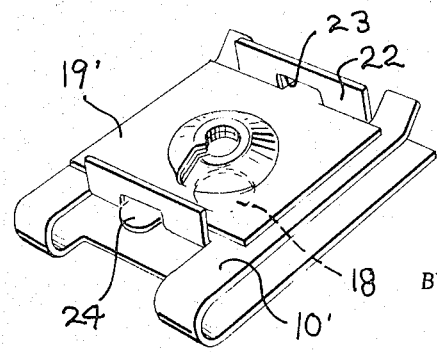
INVENTOR.
ROBERT A. MUNSE
BY *Visser & Fraser*
ATTORNEYS

United States Patent Office 3,362,278
Patented Jan. 9, 1968

3,362,278
NUT IMPRESSIONS
Robert A. Munse, Perrysburg, Ohio, assignor to The Bishop and Babcock Corporation, Toledo, Ohio, a corporation of Ohio
Filed May 6, 1966, Ser. No. 548,318
3 Claims. (Cl. 85—32)

ABSTRACT OF THE DISCLOSURE

A screw receiving fastener which has a sheet metal flat body plate formed with a nut impression in the form of an apertured frusto-conical protuberance, radially severed and with the edge of the aperture defining a thread-engaging helix. Separate and independent of the body plate is a second generally flat plate which has a substantially identical nut impression and which is in engagement with and is supported by the other nut impression, the conformation of the protuberances determining the spacing of the helices to cause a thread of an applied screw to engage the helix of the body plate and a succeeding thread to engage the helix of the second plate. The plates are connected to afford limited axial and lateral movement of the second plate relatively to the body plate.

---

This invention relates to fasteners of sheet material, such as sheet metal, but more particularly to a multiple screw-engaging fastener in which a plurality of nut impressions in plates are adapted to engage successive threads of a screw for enhancing the torsional strength of the fastener.

Reference is made to the U.S. Patent to Parr, No. 2,318,708, dated May 11, 1943, and entitled "Sheet Metal Nut," which shows a plurality of separate sheet metal members, each having a bolt opening about which are distorted edges to engage a bolt thread. One of the nuts has tongues tipped upwardly at a greater angle from the other for successive thread engagement. Thus it is necessary that one nut be formed differently than the other to effect proper spacing, and this involves costly manufacturing operations. This patent further shows an arrangement in which spacer means is employed to space one identical nut from another and this involves an extra part whose thickness must be accurate if the desired thread engagement is achieved and which presents assembly problems.

An object of this invention is to produce a sheet metal screw-engaging fastener in which several nut impressions axially nest in such manner that the spaced nut threads respectively engage successive threads of the applied screw, the nut elements being identical in structure and requiring no additional spacer means, thereby enabling the fastener to be produced more economically on a quantity basis, insuring uniformity of product and screw engagement, and affording great torque resistance.

Other objects and advantages of the invention will hereinafter appear and, for purposes of illustration but not of limitation, embodiments of the invention are shown on the accompanying drawings, in which FIGURE 1 is a composite top perspective view showing the C-clip with its nut impression and the separate plate having a similar nut impression which is superposed upon the C-clip;

FIGURE 2 is a top perspective view of the fastener shown in FIGURE 1 in assembled relation;

FIGURE 3 is an enlarged sectional view of the two nut impressions showing the nested relationship and how one is spaced from the other an amount approximately equal to the space between adjacent threads allowing for pivotal and lateral movement, a portion of a screw being applied to the fastener and showing the manner in which successive threads of the screw engage the nut impressions; and FIGURE 4 is a top perspective view of another form of C-clip showing an alternate means for securing the separate plate to the body of the clip.

The embodiment of the invention shown in FIGURES 1 and 2 comprises a sheet metal C-clip which has an upper flat plate arm 10 and a spaced lower flat plate arm 11 approximately parallel to the arm 10, the two arms being joined at one end by an integral bend or curved portion 12. At the free end of the plate arm 10 the edge portion is upwardly inclined, as indicated at 13, to facilitate application of the fastener to an edge portion of a supporting panel.

Formed approximately centrally of the upper plate arm 10 is an upwardly projecting integral nut impression 14, which comprises a frusto-conical protuberance 15 provided with a central screw-receiving hole 16. The protuberance is radially severed, either slitted or slotted, as indicated at 17, and the edges of the hole at opposite sides of the slit 17 are relatively spaced apart providing a low end and a high end of a helix which extends from the lower end and gradually upwardl about the edge of the hole to the upper side of the slit. This provides a nut for engagement by a screw S and is of a structure well known in the art and commonly called a "Prestole" so that further description of the construction and operation thereof is not considered necessary. In the lower plate arm 11 is a hole 18 which is aligned with the hole 16 of the nut impression so that a screw may extend freely therethrough.

Superposed on the flat upper arm 10 is a separate flat rectangular plate 19 of approximately the width of the plate arm 10 and somewhat shorter than the length thereof. Formed approximately centrally of the plate 19 is an upwardly projecting nut impression 14a identical with the nut impression 14. The nut impression 14a is oriented similar to that of the nut impression 14, and thus the slit 17 of the impression 14a is directly over the slit 17 in the nut impression 14 for a purpose which will hereinafter be described.

At opposite end portions of the plate arm 10 and approximately midway of the lateral dimension thereof are upwardly struck tabs 20 which are adapted to fit somewhat loosely into end notches 21 formed in the plate 19. When the tabs are folded inwardly over the upper surface of the separate plate 19 they retain the latter in position. However, the connection is such that limited floating movement is afforded between the plate 19 and the main body of the fastener. Manifestly, such floating movement enables a screw applied to the fastener readily to align the nut impressions to insure proper engagement between the screw and the nut impressions.

By referring to FIGURE 3 it will be seen that the area of contact between the upper side of the lower nut impression 14 and the under surface of the upper nut impression 14a is a limited area and the dimensions of the nut impressions are so chosen that the spacing between them is such that succeeding threads of an applied screw S engage respective nut impressions. Thus the two nut impressions nest together in a predetermined manner so as to effect such spacing between them that successive threads of the screw engage the respective nut impressions. Manifestly, in achieving this result no additional spacing means is required, it being merely necessary that the two impressions be identically oriented inasmuch as they are designed to effect the desired spacing when nested in such manner, giving reinforcement under assembly load by physical contact. By altering the relative arrangement of the nut impressions the amount of spacing may be varied. Thus identical nut impressions may be spaced from each other a greater or less distance depending upon the relative positions thereof and, as above indicated, spacing is effected without using any additional spacer elements or members. The self-aligning characteristics of the conical protuberance displays sufficient natural lead to accept a screw and orient the floating member into proper assembly position.

It should be understood that the number of superposed plates each containing a nut impression may be varied as desired, depending upon the torque strength required. The greater the number of nut impressions, the greater will be the torsional strength of the fastener. It will be further understood that the manner of securing the several plates in assembled relation may be varied. For example, FIGURE 4 shows an alternate form in which the upper flat plate arm 10' is formed with a pair of upstanding ears 22, each having a rectangular hole 23 into which extend outwardly projecting fingers 24 provided at the ends of the separate plate 19'. Here also it will be understood that the fingers 24 have limited floating movements in the holes 23.

Numerous changes in details of construction, arrangement and choice of materials may be effected without departing from the spirit of the invention especially as defined in the appended claims.

What I claim is:

1. A screw-receiving fastener comprising a generally flat body plate of sheet material, a nut impression in said plate projecting outwardly therefrom beyond the surface thereof, a second generally flat plate superposed on said body plate, said second plate being separate from and independent of said body plate, a nut impression in said second plate projecting outwardly therefrom beyond the surface thereof, means for connecting said plates for enabling limited axial and lateral movements of said second plate relatively to said body plate, the nut impressions of said plates being substantially identical and in nested arrangement with one nut impression in engagement with and supported by the other, each nut impression comprising an apertured frusto-conical protuberance, radially severed and with the edge of the aperture defining a thread-engaging helix, and the conformation of the protuberances determining the spacing of said helices to cause a thread of an applied screw to engage the helix of the body plate and a succeeding thread of such screw to engage the helix of the second plate.

2. A screw-receiving fastener as claimed in claim 1 in which the superposed nut impressions are identically arranged with respect to each other.

3. A screw-receiving fastener as claimed in claim 1 in which the amount of axial spacing of the nut impressions is determined by the orientation of one nut impression with respect to an adjacent one.

References Cited
UNITED STATES PATENTS

| | | | |
|---|---|---|---|
| 1,161,317 | 11/1915 | Kielland | 151—30 |
| 2,169,057 | 8/1939 | Place | 85—32 |
| 2,228,584 | 1/1941 | Place | 151—41.75 |
| 2,318,708 | 5/1943 | Parr | 85—36 |
| 2,581,641 | 1/1952 | Forgaard | 151—21 |

EDWARD C. ALLEN, *Primary Examiner.*